United States Patent [19]
Shiraishi

[11] Patent Number: 5,907,667
[45] Date of Patent: May 25, 1999

[54] IMAGE MATCHING WITH EQUIVALENT SHARPNESS ENHANCEMENT

[75] Inventor: Yasuhito Shiraishi, Kyoto, Japan

[73] Assignee: Dainippon Screen Manufacturing Co., Ltd., Japan

[21] Appl. No.: 08/785,895

[22] Filed: Jan. 21, 1997

[30] Foreign Application Priority Data

Jan. 25, 1996 [JP] Japan .................................. 8-32632

[51] Int. Cl.$^6$ .............................. H04N 1/58; H04N 1/60; G06K 15/12; G06K 5/00
[52] U.S. Cl. ..................... 395/109; 382/167; 382/254; 358/518; 358/447; 358/532
[58] Field of Search ................. 395/109; 382/167, 382/263, 66, 269, 254; 358/518, 520, 523, 447, 532

[56] References Cited

U.S. PATENT DOCUMENTS

| 4,972,256 | 11/1990 | Hirosawa et al. ............... 358/532 |
| 5,283,671 | 2/1994 | Stewart et al. ................. 358/532 |
| 5,313,291 | 5/1994 | Appel et al. .................... 358/501 |

FOREIGN PATENT DOCUMENTS

| 350870 | 1/1990 | European Pat. Off. . |
| 54386 | 5/1993 | European Pat. Off. . |
| 726672 | 8/1996 | European Pat. Off. . |

*Primary Examiner*—Scott Rogers
*Attorney, Agent, or Firm*—Ostrolenk, Faber, Gerb & Soffen, LLP

[57] ABSTRACT

Original image data are converted to device-independent image data expressed in a device-independent color space. The device-independent image data are re-converted to device-dependent image data expressed in a device-dependent color space used in an output device. Then, a specific sharpness enhancing process is carried out for the device-dependent image data, so as to generate output image data while the specific sharpness enhancing process is made equivalent to another sharpness enhancing process executed when a target output image is generated. This sharpness of the output image with a predetermined output device substantially agrees with that of the target output image. The method significantly improves the degree of matching in image reproduction between two different output images.

10 Claims, 4 Drawing Sheets

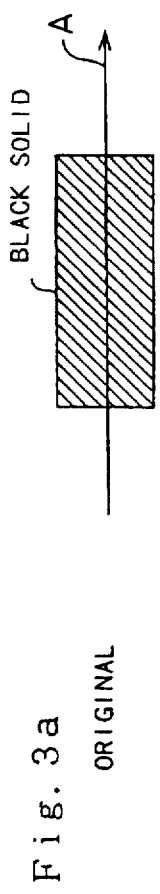
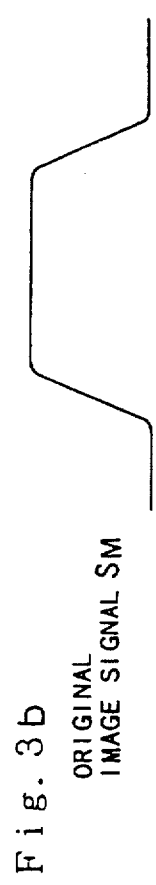
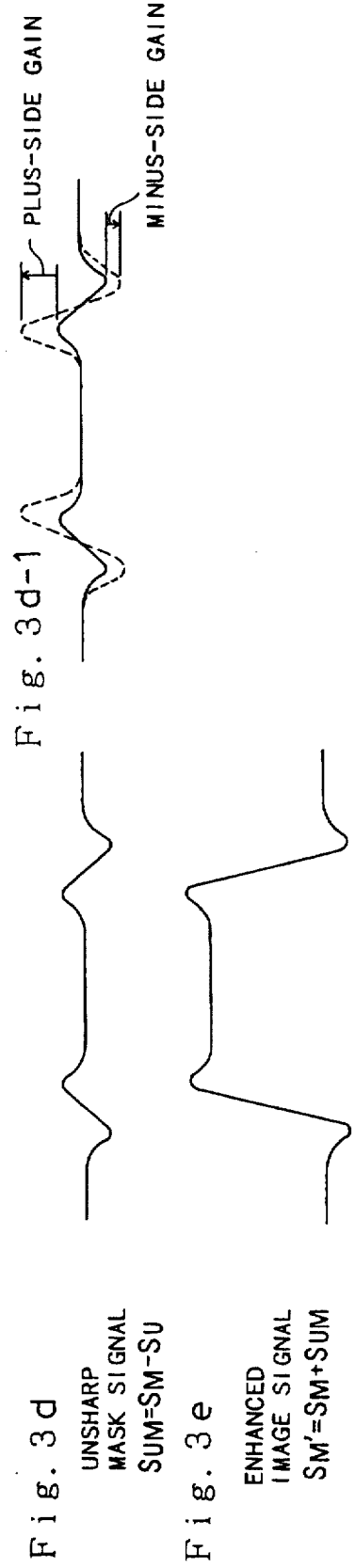

IMAGE MATCHING WITH EQUIVALENT SHARPNESS ENHANCEMENT

BACKGROUND OF THE INVENTION

1. Field of the Invention

The present invention relates to a method and an apparatus for converting image data to attain color matching between two different output images to each other.

2. Description of the Related Art

In the field of prepress process, a proof printing is made prior to the final printing, for the purpose of checking the result of the prints. In place of the conventional proof, a novel method using a variety of output devices, such as a color printer and a color display, has been developed and applied. Output devices generally used for outputting color images include color printers, color displays, and the like.

However, output images from a certain output device, such as color printers and color displays, may not sufficiently conform to actual images on prints. Thus, the proofing with a certain output device is not always satisfactory as the means of proof. The issue of the mismatching between various reproduced images is commonly observed regarding two different output images from different output devices (or output systems).

SUMMARY OF THE INVENTION

An object of the present invention is to improve the matching in image reproduction between two different output images.

The present invention is directed to a method of attaining matching between an output image reproduced from an output image data with an output device and a target output image reproduced from original image data. The method comprises the steps of: (a) converting the original image data to device-independent image data expressed in a device-independent color space; (b) converting the device-independent image data to device-dependent image data expressed in a device-dependent color space applied for the output device; and (c) executing sharpness enhancement on the device-dependent image data to generate the output image data such that the sharpness enhancement becomes equivalent to another sharpness enhancement executed when the target output image was reproduced.

Since the sharpness of the output image from an output device is made substantially equal to the sharpness of the target output image, the degree of matching in image reproduction between the two output images will be significantly improved.

Available device-independent color spaces (or color systems) include a CIE-XYZ color system, a CIE-L*a*b* color system, and a CIE-L*u*v* color system. Available device-dependent color spaces include an RGB color system, a YMCK color system, and a YUV color system (YCrCb color system).

In a preferred embodiment, the step (c) comprises the step of adjusting at least one of sharpness enhancement parameters including a size of an averaging mask used in obtaining an unsharp signal, and a gain used in obtaining an unsharp mask signal.

The output image is a color image on a display screen, and the target output image is a color print. Alternatively, the output image is a color proof, and the target output image is a color print.

The present invention is also directed to an apparatus for attaining matching between an output image reproduced from an output image data with an output device and a target output image reproduced from original image data. The apparatus comprises: conversion means for converting the original image data to device-independent image data expressed in a device-independent color space; inverse conversion means for converting the device-independent image data to device-dependent image data expressed in a device-dependent color space applied for the output device; and sharpness enhancing means for executing sharpness enhancement on the device-dependent image data to generate the output image data such that the sharpness enhancement becomes equivalent to another sharpness enhancement executed when the target output image was reproduced.

The present invention is further directed to a method of attaining matching between first and second output images reproduced from first and second output image data with first and second output devices, respectively. The method comprises the steps of: converting original image data to device-independent image data expressed in a device-independent color space; converting the device-independent image data to first device-dependent image data expressed in a first device-dependent color space applied for the first output device; converting the device-independent image data to second device-dependent image data expressed in a second device-dependent color space applied for the second output device; executing a first sharpness enhancing process on the first device-dependent image data to generate the first output image data; and executing a second sharpness enhancing process for the second device-dependent image data to generate the second output image data such that the second sharpness enhancing process is equivalent to the first sharpness enhancing process.

In a preferred embodiment, the method further comprises the step of: adjusting at least one of sharpness enhancing parameters used in the second sharpness enhancing means when a sharpness enhancing parameter used in the first sharpness enhancing means is changed such that effects of the first and second sharpness enhancing processes maintain equivalent to each other.

The present invention is also directed to an apparatus for attaining matching between first and second output images reproduced from first and second output image data with first and second output devices, respectively. The apparatus comprising: converting means for converting original image data to device-independent image data expressed in a device-independent color space; first inverse converting means for converting the device-independent image data to first device-dependent image data expressed in a first device-dependent color space applied for the first output device; second inverse converting means for converting the device-independent image data to second device-dependent image data expressed in a second device-dependent color space applied for the second output device; first sharpness enhancing means for executing a first sharpness enhancing process on the first device-dependent image data to generate the first output image data; and second sharpness enhancing means for executing a second sharpness enhancing process for the second device-dependent image data to generate the second output image data such that the second sharpness enhancing process is equivalent to the first sharpness enhancing process.

These and other objects, features, aspects, and advantages of the present invention will become more apparent from the following detailed description of the preferred embodiments with the accompanying drawings.

BRIEF DESCRIPTION OF THE DRAWINGS

FIGS. 3a through 3e show the contents of the sharpness enhancing process; and

DESCRIPTION OF THE PREFERRED EMBODIMENT

Figure 1:
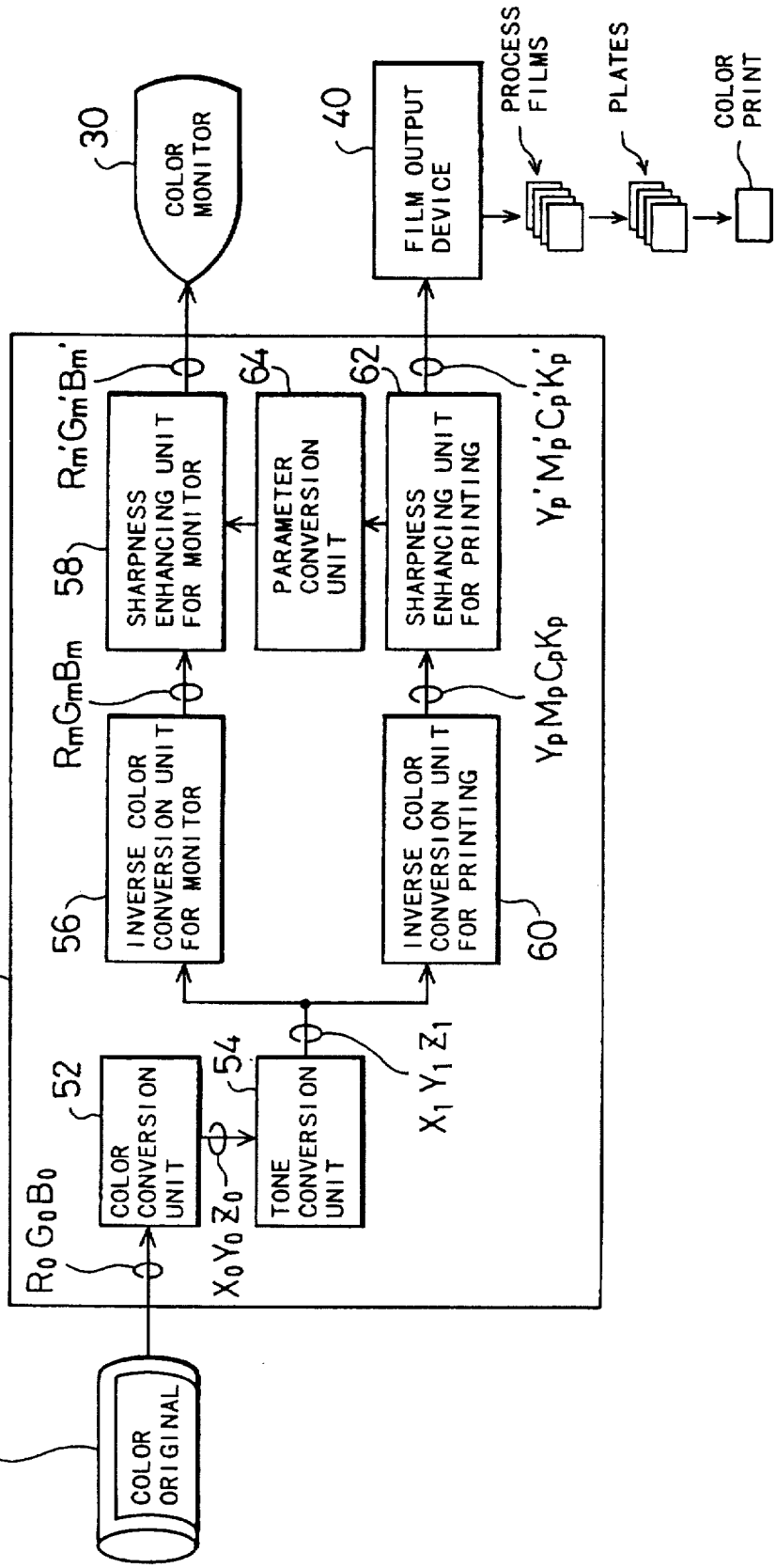
FIG. 1 is a block diagram illustrating the structure of an image processing system as a first embodiment according to the present invention.

FIG. 1 is a block diagram illustrating the structure of an image processing system as a first embodiment according to the present invention. The image processing system comprises a reading scanner 10, an image processing apparatus 20, a color monitor 30, and a film output device 40. The image processing apparatus 20 further comprises a color conversion unit 52, a tone conversion unit 54, an inverse color conversion unit 56 for the monitor, a sharpness enhancing unit 58 for the monitor, an inverse color conversion unit 60 for printing, a sharpness enhancing unit 62 for printing, and a parameter conversion unit 64.

The reading scanner 10 scans a color original to generate original image data R0, G0, and B0 expressed in the RGB color system, and supplies the original image data R0, G0, and B0 to the image processing apparatus 20. The image processing apparatus 20 executes various conversion processes for the input original image data R0, G0, and B0 as discussed below, so as to generate first output image data Rm', Gm', and Bm' expressed in the RGB color system and second output image data Yp', Mp', Cp', and Kp' expressed in the YMCK color system. The first output image data Rm', Gm', and Bm' are supplied to the color monitor 30, while the second output image data Yp', Mp', Cp', and Kp' are supplied to the film output device 40. The color monitor 30 displays a color image in accordance with the first output image data Rm', Gm', and Bm'. The film output device 40, on the other hand, provides four process films (or color separation halftone films) of yellow (Y), magenta (M), cyan (C), and black (K) in accordance with the second output image data Yp', Mp', Cp', and Kp'. These process films are applied to an exposure device (not shown) to produce plates of the four colors. A color print is then reproduced with the plates. A direct plate-making device which directly fabricates plates from the output image data Yp', Mp', Cp', and Kp' may be used in place of the film output device 40 that provides process films.

The image processing apparatus 20 carries out the following various conversion processes, in order to attain color matching of the color image displayed on the color monitor 30 with the color print which is a target output image.

The color conversion unit 52 converts the original image data R0, G0, and B0, which are expressed in the RGB color system and supplied from the reading scanner 10, to device-independent image data X0, Y0, and Z0 expressed in the device-independent CIE-XYZ color system. The 'device-independent color system' herein refers to a color system which provides color expressions that do not depend upon a particular output device. The color system used in each output device (such as the RGB color system or the YMCK color system), on the other hand, provides color expressions most suitable for the output device. Color data in the device-independent color system can be therefore inversely converted to another color data in the device-dependent color system which is used for a particular utput device to provide color expressions suitable for the utput device.

The tone conversion unit 54 changes the tone of the evice-independent image data X0, Y0, and Z0, so as to ompress or map a color reproduction range of a color original to another color range that is reproducible in prints. The tone conversion unit 54 is required because the prints generally have a narrower color reproduction range than the color original, such as a photograph. The tone conversion unit 54 produces device-independent image data X1, Y1, and Z1 to supply the same to the inverse color conversion unit 56 for the monitor and the inverse color conversion unit 60 for printing. Before being supplied to the inverse color conversion unit 56 for the monitor and the inverse color conversion unit 60 for printing, the device-independent image data X1, Y1, and Z1 may be applied to various other processing such as color correction, retouch, or the like.

The inverse color conversion unit 56 for the monitor converts the device-independent image data X1, Y1, and Z1 to device-dependent image data Rm, Gm, and Bm in the RGB color system suitable for the color monitor 30. The sharpness enhancing unit 58 for monitor carries out a sharpness enhancing process for the device-dependent image data Rm, Gm, and Bm to generate output image data Rm', Gm', and Bm'. The output image data Rm', Gm', and Bm' are given to the color monitor 30 to display a color image.

The inverse color conversion unit 60 for printing converts the device-independent image data X1, Y1, and Z1 to device-dependent image data Yp, Mp, Cp, and Kp in the YMCK color system suitable for the film output device 40 (more precisely, the YMCK color system suitable for an output system including the film output device 40, a plate exposure device, and a printer). The sharpness enhancing unit 62 for printing carries out a sharpness enhancing process for the device-dependent image data Yp, Mp, Cp, and Kp to generate output image data Yp', Mp', Cp', and Kp'. The output image data Yp', Mp', Cp', and Kp' are supplied to the film output device 40, which then prepares process films based thereon.

Figure 2:
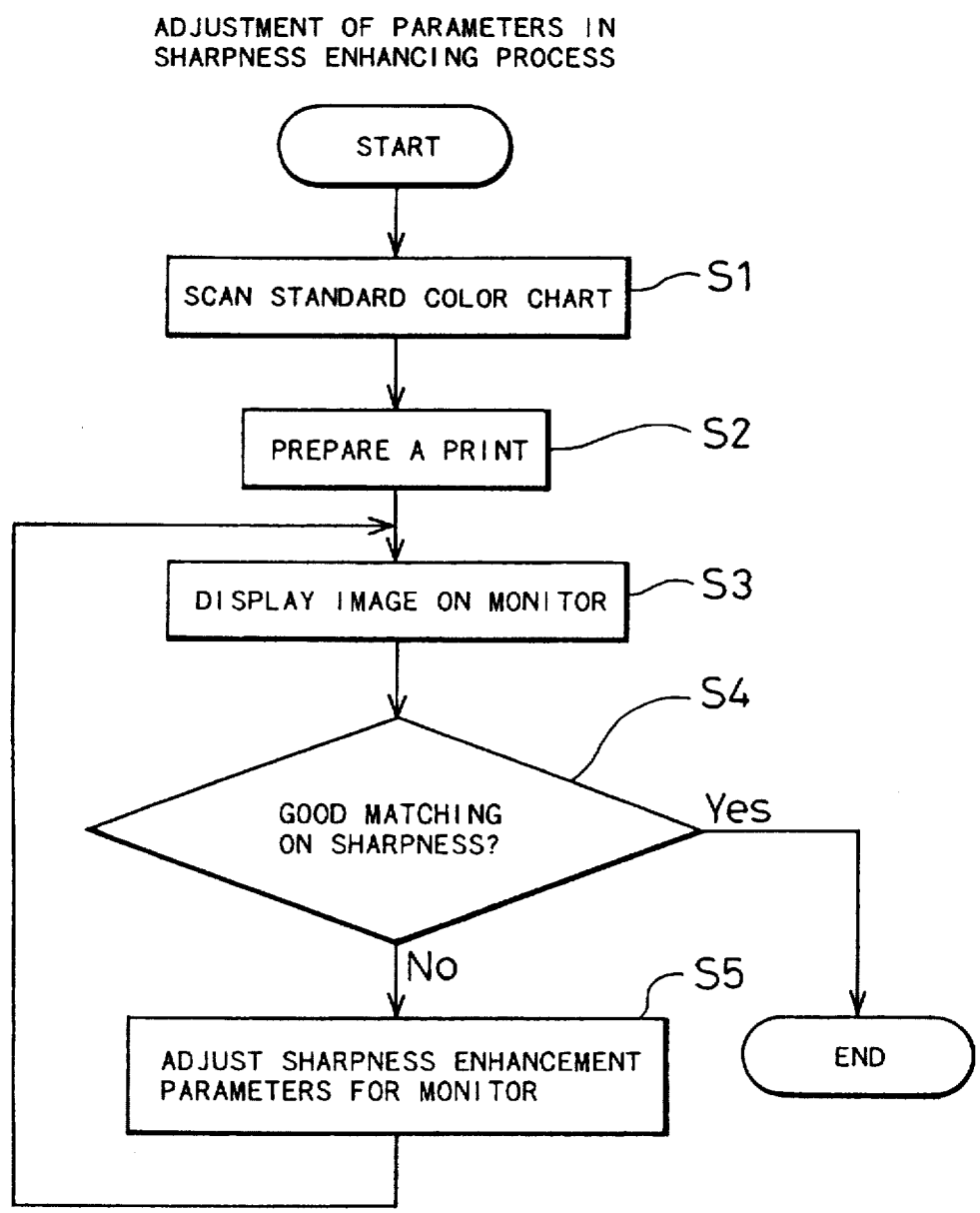
FIG. 2 is a flowchart showing a routine of adjusting sharpness enhancement parameters used in the sharpness enhancing unit 58 for the monitor.

In this embodiment, the sharpness enhancing process carried out by the sharpness enhancing unit 58 for the monitor is adjusted to attain the effects equivalent to those of the sharpness enhancing process carried out by the sharpness enhancing unit 62 for printing. FIG. 2 is a flowchart showing a routine of adjusting sharpness enhancement parameters used in the sharpness enhancing unit 58 for the monitor. At step S1, a standard color chart is scanned by the reading scanner 10. The color chart represents a regular arrangement of square color patches, which are filled with a plurality of standard colors, both in rows and columns. A color original other than the standard color chart may also be used. The standard color chart is, however, preferable because it is easy to check the color matching or sharpness matching between the color image of the chart displayed on the color monitor and the actual print of the chart.

At step S2, a color print is reproduced based on the original image data R0, G0, and B0 obtained by the scanning of the standard color chart. In a concrete procedure, the image processing apparatus 20 generates the output image data Yp', Mp', Cp', and Kp' from the original image data R0, G0, and B0, and the film output device 40 prepares process films based on the output image data Yp', Mp', Cp', and Kp'. The plate exposure device then fabricates plates from the process films, and the printer reproduces a color print using the plates.

At step S3, a color image is displayed on the color monitor 30 based on the original image data R0, G0, and B0. In a concrete procedure, the image processing apparatus 20 generates the output image data Rm', Gm', and Bm' from the original image data R0, G0, and B0, and the color monitor 30 displays a color image based on the output image data Rm', Gm', and Bm'.

At subsequent step S4, the operator compares the color image displayed on the color monitor 30 with the print, in order to check the degree of matching. It is preferable to observe the print in certain standard light.

When the degree of matching of the two images is not satisfactory, the program proceeds to step S5, at which the parameters used in the sharpness enhancing unit 58 for the monitor are modified. The following describes the parameters used in the sharpness enhancing process. FIGS. 3a–3e illustrate the sharpness enhancing process. An original image signal $S_M$ of FIG. 3b is obtained by scanning an original of FIG. 3a in the direction indicated by an arrow A. An unsharp signal $S_U$ of FIG. 3c is obtained by averaging the original image signal $S_M$. An unsharp mask signal $S_{UM}$ of FIG. 3d is obtained by subtracting the unsharp signal $S_U$ from the original image signal $S_M$. An enhanced image signal $S_M'$ of FIG. 3e is obtained by adding the unsharp mask signal $S_{UM}$ to the original image signal $S_M$.

A one-dimensional or two-dimensional averaging mask (averaging filter) is used in the averaging process for obtaining the unsharp signal $S_U$ of FIG. 3c. The size of the averaging mask is one of the parameters used in the sharpness enhancing process. FIG. 3c-1 shows a variation in unsharp signal $S_U$ with a change in mask size. An increase in mask size makes the slope of the unsharp signal $S_U$ more gentle, whereas a decrease in mask size makes the slope of the unsharp signal $S_U$ more steep.

A gain for obtaining the unsharp mask signal $S_{UM}$ shown in FIG. 3d is also one of the parameters in the sharpness enhancing process. FIG. 3d-1 shows a variation in unsharp mask signal $S_{UM}$ with a change in gain of the unsharp mask signal; it may also be referred to as 'gain in the sharpness enhancing process'. In this embodiment, a plus-side gain and a minus-side gain can be set independently of each other. The plus-side gain amplifies the plus signal value of the unsharp mask signal $S_M$, and the minus-side gain amplifies the minus signal value of the unsharp mask signal $S_{UM}$.

The program repeats the processing of steps S3 through S5 in the flowchart of FIG. 2 to adjust the parameters in the sharpness enhancing process including the mask size, the plus-side gain, and the minus-side gain, thereby enabling the sharpness of the color image displayed on the color monitor 30 to be coincident with the sharpness of the print. This realizes the good matching not only on the color reproduction but also on the sharpness, thus improving the degree of matching in image reproduction between the two different output images.

After the adjustment of the sharpness, the parameters in the sharpness enhancing process may be changed in the sharpness enhancing unit 62 for printing. Under such conditions, the parameter conversion unit 64 has a function of adjusting the parameters in the sharpness enhancing unit 56 for the monitor corresponding to a change in parameters in the sharpness enhancing unit 62 for printing.

By way of example, a mask size Zm in the sharpness enhancing process with respect to the output image data for the color monitor 30 is related to a mask size Zp in the sharpness enhancing process with respect to the output image data for prints by the following Equation (1):

$$Rm/Zm = Rp/Zp \quad (1)$$

wherein Rp denotes a resolution [dpi] of the color monitor 30, and Rp denotes a resolution [dpi] of the film output device 40.

Equation (1) given above indicates that the spatial frequency characteristics (that is, the mask sizes Zm and Zp) of the unsharp signal $S_U$ applied to the output image data of the respective output devices (the color monitor 30 and the film output device 40) should be set to be inversely proportional to the resolutions Rm and Rp (also referred to as the line densities) of the respective output devices.

As clearly shown in this example, the parameters in the sharpness enhancing process for the output image data of the film output device 40 are, in general, closely correlated with the parameters in the sharpness enhancing process for the output image data of the color monitor 30. In accordance with a preferred embodiment, the correlations of the respective parameters may be set in advance in the parameter conversion unit 64. This allows a change in parameters in the sharpness enhancing unit 62 for printing to reflect a change in parameters in the sharpness enhancing unit 58 for the monitor. Once the effects of the sharpness enhancing process in the sharpness enhancing unit 58 for the monitor and the sharpness enhancing unit 62 for printing are adjusted in accordance with the routine of FIG. 2, even when the parameters in the sharpness enhancing unit 62 for printing are varied, the effect of the sharpness enhancing process in the sharpness enhancing unit 62 for printing can be kept equivalent to that in the sharpness enhancing unit 58 for the monitor 30.

The respective constituents of the image processing apparatus 20 shown in FIG. 1 may be realized by either hardware or software. In case of implementation with software, a CPU (microprocessor) executes computer program codes (application programs) stored in a main memory of the computer system so as to implement the respective functions. The computer programs are transferred from a portable storage medium (carriable storage medium), such as floppy disks and CD-ROMs, to the main memory of the computer system or an external storage device and stored therein. Alternatively the computer programs may be supplied from a remote program supplier apparatus to the computer system via a communication line.

Figure 4:
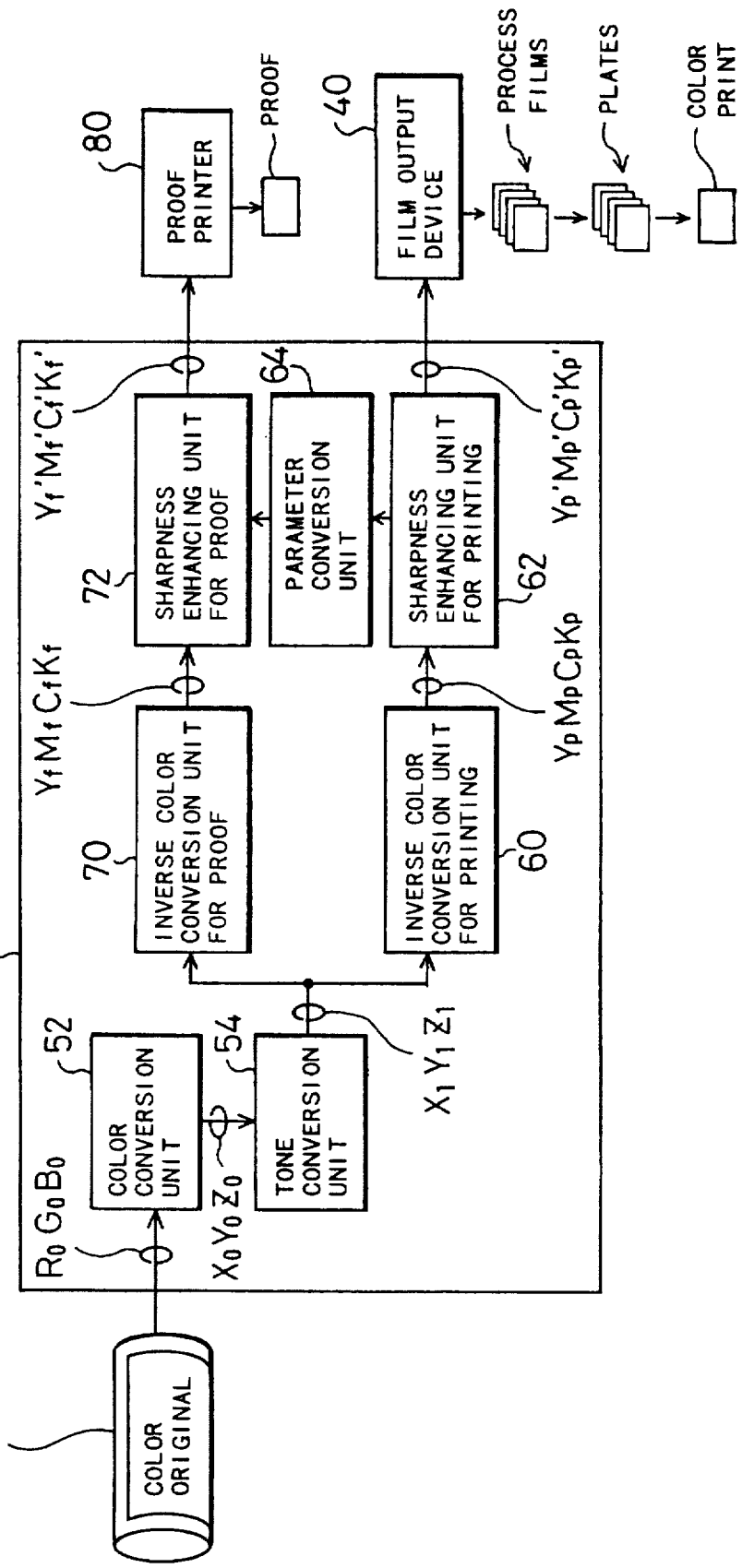
FIG. 4 is a block diagram illustrating the structure of another image processing system as a second embodiment according to the present invention.

FIG. 4 is a block diagram illustrating the structure of another image processing system as a second embodiment according to the present invention. The image processing system of FIG. 4 has similar structure to that of FIG. 1, except that the color monitor 30, the inverse color conversion unit 56 for the monitor, and the sharpness enhancing unit 58 for the monitor in FIG. 1 are respectively replaced by a color printer 80 for proof, an inverse color conversion unit 70 for proof, and a sharpness enhancing unit 72 for proof.

The inverse color conversion unit 70 for proof converts the device-independent image data X1, Y1, and Z1 to device-dependent image data Yf, Mf, Cf, and Kf in the YMCK color system used in the color printer 80 for proof. The sharpness enhancing unit 72 for proof carries out the sharpness enhancing process on the device-dependent image data Yf, Mf, Cf, and Kf, so as to generate output image data Yf', Mf', Cf', and Kf'. The color printer 80 for proof receives the output image data Yf', Mf', Cf', and Kf' to reproduce a color proof.

In the second embodiment, the inverse color conversion unit 70 for proof and the sharpness enhancing unit 72 for proof are controlled to make the image reproduction (color reproduction and sharpness) of the proof generated by the color printer 80 for proof match well with the image reproduction of the prints. This gives a proof having the sufficiently high degree of matching both in color reproduction and sharpness.

Although CIE-XYZ color system is used in the above embodiments, various other device-independent color systems may be applied, such as CIE-L*a*b* color system and CIE-L*u*v* color system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of attaining matching between first and second output images reproduced from first and second output image data with first and second output devices, respectively, said method comprising the steps of:

converting original image data to device-independent image data expressed in a device-independent color space;

converting said device-independent image data to first device-dependent image data expressed in a first device-dependent color space applied for said first output device;

converting said device-independent image data to second device-dependent image data expressed in a second device-dependent color space applied for said second output device;

executing a first sharpness enhancing process on said first device-dependent image data to generate said first output image data; and executing a second sharpness enhancing process on said second device-dependent image data to generate said second output image data such that said second sharpness enhancing process is equivalent to said first sharpness enhancing process.

2. A method in accordance with claim 1, further comprising the step of:

adjusting at least one of sharpness enhancing parameters used in said second sharpness enhancing process when a sharpness enhancing parameter used in said first sharpness enhancing process is changed such that effects of said first and second sharpness enhancing processes maintain equivalent to each other.

3. A method in accordance with claim 2, wherein said sharpness enhancement parameters include a size of an averaging mask used in obtaining an unsharp signal, and a gain used in obtaining an unsharp mask signal.

4. A method in accordance with claim 1, wherein said first output image is a color print, and said second output image is a color image on a display screen.

5. A method in accordance with claim 1, wherein said first output image is a color print, and said second output image is a color proof.

6. An apparatus for attaining matching between first and second output images reproduced from first and second output image data with first and second output devices, respectively, said apparatus comprising:

converting means for converting original image data to device-independent image data expressed in a device-independent color space;

first inverse converting means for converting said device-independent image data to first device-dependent image data expressed in a first device-dependent color space applied for said first output device;

second inverse converting means for converting said device-independent image data to second device-dependent image data expressed in a second device-dependent color space applied for said second output device;

first sharpness enhancing means for executing a first sharpness enhancing process on said first device-dependent image data to generate said first output image data; and second sharpness enhancing means for executing a second sharpness enhancing process for said second device-dependent image data to generate said second output image data such that said second sharpness enhancing process is equivalent to said first sharpness enhancing process.

7. An apparatus in accordance with claim 6, further comprising:

parameter adjusting means for adjusting at least one of sharpness enhancing parameters used in said second sharpness enhancing means when a sharpness enhancing parameter used in said first sharpness enhancing means is changed such that effects of said first and second sharpness enhancing processes maintain equivalent to each other.

8. A method in accordance with claim 7, wherein said sharpness enhancement parameters include a size of an averaging mask used in obtaining an unsharp signal, and a gain used in obtaining an unsharp mask signal.

9. A method in accordance with claim 6, wherein said first output image is a color print, and said second output image is a color image on a display screen.

10. A method in accordance with claim 6, wherein said first output image is a color print, and said second output image is a color proof.

* * * * *